United States Patent [19]

Cleveland et al.

[11] 4,431,334

[45] Feb. 14, 1984

[54] POWER TAKEOFF YOKE SHIELDING AND ENGAGING MEANS

[75] Inventors: Donald C. Cleveland; Paul R. Dallas, both of Rochester, Mich.

[73] Assignee: Rockwell International Corporation, Pittsburgh, Pa.

[21] Appl. No.: 372,595

[22] Filed: Apr. 25, 1982

[51] Int. Cl.³ .................... B25G 3/18; F16B 21/00; F16D 1/00

[52] U.S. Cl. .................................. 403/322; 403/317; 403/328; 464/134

[58] Field of Search ............... 403/316, 317, 322, 325, 403/328; 24/211 N, 211 L; 464/134, 170, 179

[56] References Cited

U.S. PATENT DOCUMENTS

| 3,357,206 | 12/1967 | Christie | 403/325 X |
| 3,480,310 | 11/1969 | McElwain | 403/322 |
| 3,747,966 | 7/1973 | Wilkes et al. | 403/322 X |
| 3,822,951 | 7/1974 | Bornzin | 403/316 |
| 4,169,686 | 10/1979 | Balensieten et al. | 403/322 X |
| 4,289,414 | 9/1981 | Recker | 403/325 X |

FOREIGN PATENT DOCUMENTS 2063991 11/1979 United Kingdom ................ 403/322

*Primary Examiner*—Wayne L. Shedd

[57] ABSTRACT

An outer collar on a power takeoff yoke sleeve locks against an inner collar to rotate the yoke and sleeve in a first direction to align splines within the sleeve with splines on a power takeoff stub shaft. Cooperating teeth between the inner collar and the outer collar permit the outer collar to rotate freely in the opposite direction. The outer collar surrounds the inner collar and detent operators and the small end of a ball which protects the yoke from unintentional contact. The outer collar is grasped and is slightly turned to align the yoke splines and stub shaft splines while pushing the outer collar toward the stub shaft to slide the sleeve over the stub shaft. The stub shaft pushes a detent holdout longitudinally and releases the detent to move inward into a groove on the stub shaft. A heavy spring on the sleeve pushes a detent operating and locking device axially to move the detent inward into the groove in the stub shaft. Pulling axially outward on the sleeve pushes the detent actuator axially, releasing the detent to move radially outward as the sleeve is pulled off of the power takeoff stub shaft. A spring between the detent actuator and the outer collar returns the outer collar axially towards the open end of the sleeve.

8 Claims, 5 Drawing Figures

POWER TAKEOFF YOKE SHIELDING AND ENGAGING MEANS

BACKGROUND OF THE INVENTION

1. Field of the Invention

This invention relates to shafts and mechanisms for connecting implement shafts to power takeoff shafts on vehicles especially tractors.

A problem exists in such connection. When the implement shaft and connecting yoke are fully protected from accidental contact by shielding, it is difficult to turn the implement shaft to align internal splines in the shaft with external splines on the vehicle power takeoff stub shaft.

This invention provides a means of locking a protective shielding to an implement power takeoff shaft that permits the shaft to be turned while locking the shaft and which rotates freely on the shaft after the shaft is attached to the stub shaft of a vehicle.

2. Description of the Prior Art

Revelant prior patents existing in the United States Patent and Trademark Office include: U.S. Pat. Nos. 3,969,033, 3,551,013, 3,884,536, 3,344,618.

U.S. Pat. No. 3,969,033 shows a torque transmitting coupling that has a free spinning shield disposed around the housing. The guard is attached to the coupling by means of two snap rings.

U.S. Pat. No. 3,551,013 shows a power shaft coupling device surrounded by a safety shield. A collar engageable with splines on the exterior of the power takeoff (PTO) shaft allows for quick aligning of the two shafts.

U.S. Pat. No. 3,884,536 shows a protective guard device for a transmission shaft with conical guard members extending over the yoke arms.

U.S. Pat. No. 3,344,618 shows a safety shield that can be used in PTO and implement couplings. The shield can rotate independently of the shaft and coupling.

Other less pertinent patents that represent a cross section of PTO shaft shields include: U.S. Pat. Nos. 4,008,583, 3,992,120, 3,960,850, 2,953,000.

The primary object of the present invention is to provide a power takeoff shaft coupling apparatus comprising a sleeve having internal splines for receiving external splines of a power takeoff stub shaft, the sleeve having a radial opening therein, detent means positioned in the radial opening for moving radially inward through the opening to engage a groove in a power takeoff stub shaft, detent locking means mounted on the sleeve adjacent the detent means and slidable on the sleeve from a position radially aligned with the detent means for locking the detent means to an inward position longitudinally displaced from the detent means for releasing the detent means to a radially outward position, an outer collar rotatably and slidably mounted on the sleeve, the outer collar having abutment means oposed to the detent means for pushing the detent means to its second, disengaged position, an inner collar mounted on the sleeve within the outer collar and secured to the sleeve, the inner collar and the outer collar having complementary teeth for permitting relative turning of the collars in a first direction and for preventing relative turning of the collars in a second opposite direction, whereby when the complementary teeth are operatively engaged, the outer collar turns the sleeve via the inner collar in a first direction to align internal splines in the sleeve with external splines on a power takeoff stub shaft.

A further object of the present invention is to provide a power takeoff shaft coupling apparatus further comprising a detent holdout means slidably mounted within the sleeve between a first active position radially aligned with the radial opening and the detent and a second longitudinally displaced inoperative position for releasing the detent means to move radially inward.

Still another object of the present invention is to provide a power takeoff shaft coupling apparatus wherein said sleeve has a first opening for receiving a power takeoff stub shaft and further comprising an abutment mounted at a second longitudinal end of the sleeve, and a first compression spring positioned between the abutment and the detent disabling means for urging the detent disabling means into an operative position, whereby, when a stub shaft is inserted in the sleeve, the stub shaft pushes the detent disabling means towards the abutment and permits the detent to move radially inward into a groove in the stub shaft.

Another object of the present invention is to provide a power takeoff shaft coupling apparatus wherein said sleeve comprises a radial extension longitudinally remove from the inner collar and further comprising a relatively heavy spring positioned on the sleeve between the radial extension and the detent locking means for urging the locking means from its second inoperative position to its first operative position radially aligned with the detent means.

A further object of the present invention is to provide a power takeoff shaft coupling apparatus wherein the said detent locking means comprises an inner surface displaced outward and upward in the direction of the detent means whereby the detent means and the inner surface cooperate to move the detent means radially inward in response to movement of the detent locking means to its second radially aligned operative position.

Another object of the present invention is to provide a power takeoff shaft coupling apparatus wherein the said apparatus further comprises a relatively light compression spring mounted between the detent locking means and the abutment means on the outer collar for urging the abutment means away from the detent locking means towards engagement with the inner collar.

An additional object of the present invention is to provide a power takeoff shaft coupling apparatus wherein the outer sleeve surrounds the inner sleeve, the detent means, the detent locking means and a portion of the sleeve, whereby the inner sleeve, the detent means and the detent locking means are protected from accidental contact.

Still another object of the present invention is to provide a power takeoff shaft coupling apparatus wherein the sleeve further comprises a yoke on an end thereof opposite an open end which receives a power takeoff stub shaft and further comprises a bell mounted on the sleeve for relative rotation, whereby the yoke and the sleeve may rotate within the bell, the bell having an inner end extending within the outer collar whereby the outer collar and bell cooperate to prevent accidental contact with the sleeve.

Objects of the invention are apparent in the above and ongoing description and claims and the drawings.

SUMMARY OF THE INVENTION

The present invention provides a means of locking a protective shielding for an implement power takeoff shaft, which shielding freely rotates on the shaft after the shaft is connected to the power takeoff stub shaft of a vehicle.

The present invention provides means for locking protective shielding to the implement power takeoff shaft while aligning splines during engagement of the power takeoff shaft to a tractor stub shaft. The shield rotates freely and independently from the power takeoff shaft after the shaft is fixed to the vehicle shaft.

Teeth on an outer rotatable collar engage with teeth on an inner collar which is fixed on the power takeoff yoke sleeve. This allows the power takeoff yoke to be rotated in a clockwise direction to align the yoke splines with the vehicle stub shaft splines. The outer collar acts as a shield and is free to rotate in a counter-clockwise direction independent of the power takeoff yoke. Since the power takeoff yoke is conventionally driven in a clockwise direction, the sleeve may remain stationary while the yoke is driven.

An outer collar on a power takeoff yoke sleeve locks against an inner collar to rotate the yoke and sleeve in a first direction to align splines within the sleeve with splines on a power takeoff stub shaft. Cooperating teeth between the inner collar and the outer collar permit the outer collar to rotate freely in the opposite direction. The outer collar surrounds the inner collar and detent operators and the small end of a ball which protects the yoke from unintentional contact. The outer collar is grasped and is slightly turned to align the yoke splines and stub shaft splines while pushing the outer collar toward the stub shaft to slide the sleeve over the stub shaft. The stub shaft pushes a detent holdout longitudinally and releases the detent to move inward into a groove on the stub shaft. A heavy spring on the sleeve pushes a detent operating and locking device axially to move the detent inward into the groove in the stub shaft. Pulling axially outward on the sleeve pushes the detent actuator axially, releasing the detent to move radially outward as the sleeve is pulled off of the power takeoff stub shaft. A spring between the detent actuator and the outer collar returns the outer collar axially towards the open end of the sleeve.

DESCRIPTION OF THE PREFERRED EMBODIMENT

Figure 1:
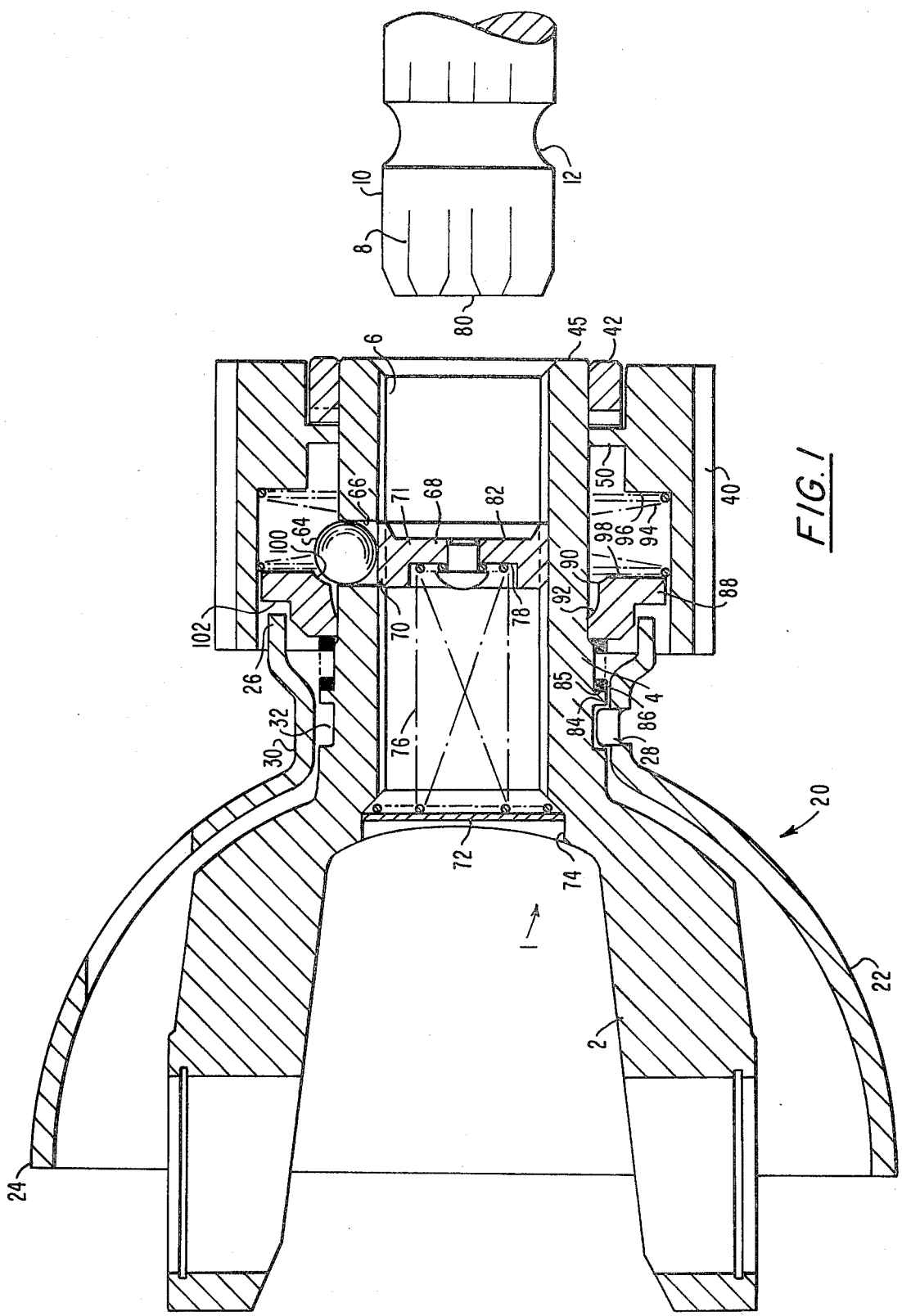
FIG. 1 is a cross sectional elevational view of a power takeoff with a shield and coupling device of the present invention.

Referring to FIG. 1, a power takeoff yoke assembly 1 has a yoke portion 2 and a sleeve portion 4. Sleeve 4 has grooves or internal splines 6 for cooperating with grooves or external splines 8 on vehicle power takeoff stub shaft 10. Groove 12 of stub shaft 10 receives a detent as later will be described.

The power takeoff yoke assembly carries a protective shielding assembly generally indicated by the number 20 which consists of a yoke surrounding bell 22 with a large end 24 and a small end 26. The bell has a depression 28 in its throat 30 which is received in a groove 32 on the sleeve 4 of the yoke assembly 1. Bell 22 is thus mounted on sleeve 4 in a manner which permits the bell to freely rotate on the sleeve and which protects against accidental contact with the rotating yoke 2. The protective shield assembly 20 also includes an outer collar 40 which is mounted on the sleeve 4 of the power takeoff yoke assembly 1 for free rotation thereon. Outer collar 40 covers the small end 26 of bell 22 to complete the shield around the sleeve 4 of the yoke assembly 1.

Figure 2:
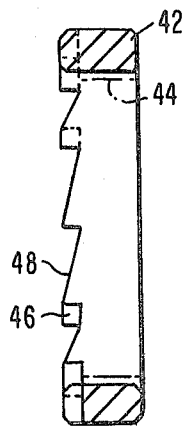
FIG. 2 is a cross sectional elevational detail of the inner collar.
Figure 3:
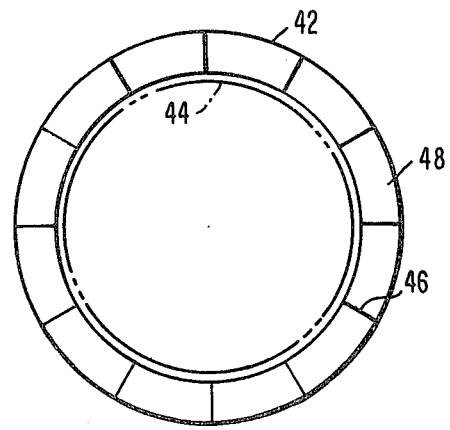
FIG. 3 is an elevation of the inner collar.

As shown in FIGS. 1, 2 and 3, an inner collar 42 is mounted on the outer, open end 44 of sleeve 4, which receives the stub shaft 10.

As shown in FIGS. 2 and 3, inner collar 42 has internal threads 44, which is for example a two inch diameter 16 U.N. left hand thread for securing a complementary thread on the outer axially extending surface of outer end 44 of sleeve 4. Sleeve 4 has rearward facing teeth 46 with sloped surfaces 48. Tooth surfaces 46 are arranged on radii of the inner collar as shown in FIG. 3 to prevent relative turning of complementary teeth in a clockwise direction with reference to FIG. 3. Inner collar 42 may be counter bored so that a radial pin may lock inner collar 42 on sleeve 4.

Figure 4:
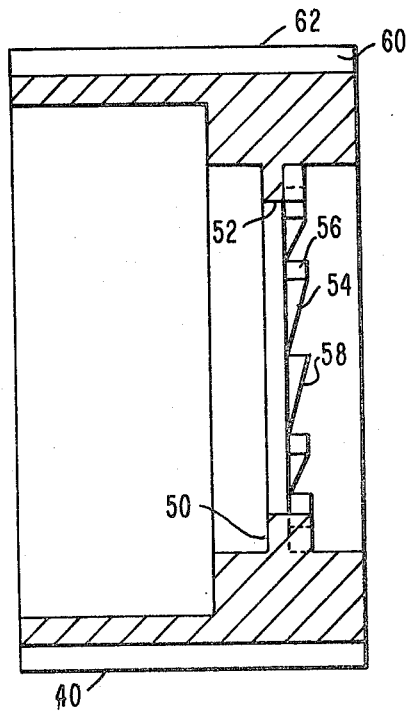
FIG. 4 is a cross sectional elevational detail of the outer collar.
Figure 5:
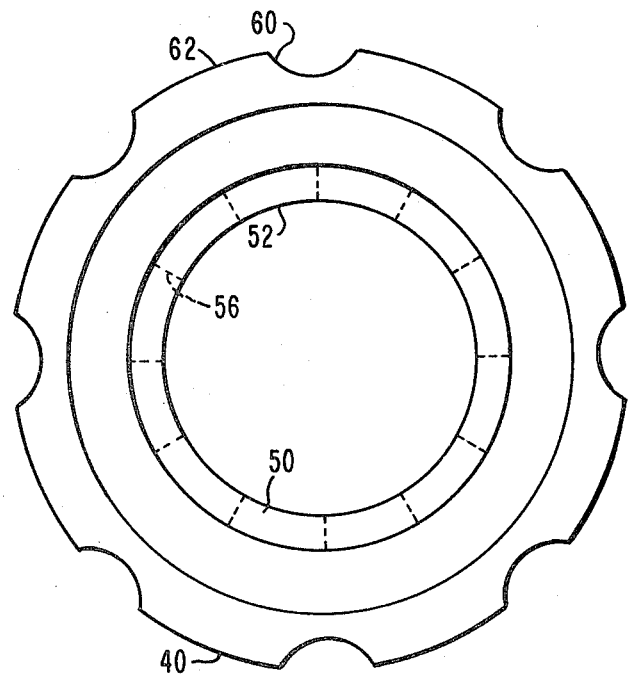

Outer collar 40 has an inward projection 50 as shown in FIGS. 4 and 5. Inward projection 50 has an inward diameter 52 which fits over external splines 8 on the stub shaft 10.

Teeth 54 of outer collar 40 have radial faces 56 and sloping surfaces 58. Radial faces 56 cooperate with radial surfaces 48 on teeth 46 of the inner collar 42 to prevent relative turning of the sleeve in a clockwise direction. Sloping surfaces 48 on teeth of the inner collar 42 and radial surfaces 58 on teeth 54 of the outer collar 40 cooperate to permit overriding and relative turning of the outer collar in a counterclockwise direction with respect to the inner collar.

Fluted depressions 60 in the outer surface 62 of the outer collar 40 permit gripping of the collar and turning the sleeve with one hand. A typical dimension of the outer surface of the outer collar is approximately four inches in diameter to permit the outer collar to be gripped by one hand.

As shown in FIGS. 1, a detent means 64, such as a ball in a preferred embodiment, fits within a radial opening 66 through sleeve 4.

Since the power takeoff is shown in its disengaged position, detent means 64 is shown in its deactivated position, held outwardly by a detent holdout means 68. The detent holdout means 68 comprises a cylindrical body 71 with outward splines 70 which cooperate with internal splines 6 in sleeve 4 to permit the detent holdout means 68 to slide along the internal splines 6. A retainer 72 is press fitted into a recess 74 in yoke 2. A compression spring 76 bears against retainer 72 and a depression 78 in detent holdout means 68 to urge the detent holdout to its operative holdout position as shown in the drawing.

When the outer end 80 of stub shaft 10 is slid into sleeve 4, the outer end 80 engages the axial surface 82 on detent holdout 68. Further movement of the stub shaft into the sleeve 4 pushes detent holdout 68 against the force of compression spring 76 to an inactive position toward the left of the drawing. The sleeve 4 is pushed onto the shaft, with detent means 64 riding along stub shaft 10 until the detent means engages groove 12. Sleeve 4 has a radial extension 84 which forms an abutment 85 for relatively heavy coil spring 86 which also abuts against a detent locking device or means 88. As the detent locking means 88 is pushed to the right as shown in the drawing, the circular edge 90 pushes on detent means 64 to force the detent means inward. As the detent locking means 88 is pushed to the right by heavy spring 86, the surface 92 contacts the detent means and holds the detent means inward in groove 12 of the stub shaft.

During the initial connection of the yoke assembly 1 to the stub shaft 10, the outer collar 40 is grasped and is held to align the sleeve 4 with stub shaft 10. The outer collar 40 is slightly turned in a clockwise direction to turn inner collar 42 and sleeve 4 in a clockwise direction to align internal splines 6 in sleeve 4 with external splines 8 on stub shaft 10.

The assembly force is continued until the detent means 64 clicks into groove 12 in the stub shaft, when the yoke assembly 1 is fully mated on the stub shaft 10.

To disconnect the yoke assembly 1 from the stub shaft 10, outer collar 40 is grasped and is pulled to the left as shown in the drawing. Relatively light compression spring 94 is compressed by abutment 96 and bears against face 98 to push the detent locking means 88 to the left to release the detent means 64. Further pulling to the left on outer collar 40 pushes against relatively heavy spring 86 and abutment 84 to pull sleeve 4 from the stub shaft 10. Detent means 64 rides up the curved surface of groove 12 and seats in recess 100 of the detent locking means 88.

It should also be pointed out that the radial surface 102 of the detent locking means 88 may contact small end 26 of bell 22, which acts through depression 28 and groove 32 to pull yoke assembly 1 from the stub shaft 10.

By virtue of the present invention, the problem of aligning the internal and external splines when connecting the yoke assembly on the stub shaft is avoided since the yoke assembly shaft and collar may be turned to align the internal splines with the external splines on the stub shaft.

When the stub shaft 10 is turned after connection to turn the yoke assembly, the stub shaft turns in a clockwise direction, leaving the outer collar 40 free to rotate in a counterclockwise direction or to remain stationary with the bell section 22 of the shield assembly 20.

Should the power takeoff inadvertently start in a clockwise direction while a person is holding sleeve 4, no danger to the person holding the sleeve will be encountered.

While providing full shielding and permitting turning of the power takeoff yoke shaft during assembly, the present invention permits a simple push-pull connection/disconnection for the yoke assembly and stub shaft.

While the invention has been described with reference to specific embodiments, modifications and variations of the invention may be constructed without departing from the scope of the invention which is defined in the following claims.

We claim:

1. Power takeoff shaft coupling apparatus comprising sleeve having internal splines for receiving external splines of a power takeoff stub shaft, the sleeve having a radial opening therein, detent means positioned in the radial opening for moving radially inward through the opening to engage a groove in a power takeoff stub shaft, detent locking means mounted on the sleeve adjacent the detent means and slidable on the sleeve from a position radially aligned with the detent means for locking the detent means to an inward position longitudinally displaced from the detent means for releasing the detent means to a radially outward position, an outer collar rotatably and slidably mounted on the sleeve, the outer collar having abutment means opposed to the detent means for pushing the detent means to its second, disengaged position, an inner collar mounted on the sleeve within the outer collar and secured to the sleeve, the inner collar and the outer collar having complementary teeth for permitting relative turning of the collars in a first direction and for preventing relative turning of the collars in a second opposite direction, whereby when the complementary teeth are operatively engaged, the outer collar turns the sleeve via the inner collar in a first direction to align internal splines in the sleeve with external splines on a power takeoff stub shaft.

2. The apparatus of claim 1 further comprising a detent holdout means slidably mounted within the sleeve between a first active position radially aligned with the radial opening and the detent and a second longitudinally displaced inoperative position for releasing the detent means to move radially inward.

3. The apparatus of claim 2 wherein the sleeve has a first opening for receiving a power takeoff stub shaft and further comprising an abutment mounted at a second longitudinal end of the sleeve, and a first compression spring positioned between the abutment and the detent disabling means for urging the detent disabling means into an operative position, whereby, when a stub shaft is inserted in the sleeve, the stub shaft pushes the detent disabling means towards the abutment and permits the detent to move radially inward into a groove in the stub shaft.

4. The apparatus of claim 1 wherein the sleeve comprises a radial extension longitudinally remote from the inner collar and further comprising a relatively heavy spring positioned on the sleeve between the radial extension and the detent locking means for urging the locking means from its second inoperative position to its first operative position radially aligned with the detent means.

5. The apparatus of claim 4 wherein the detent locking means comprises an inner surface displaced outward and upward in the direction of the detent means whereby the detent means and the inner surface cooperate to move the detent means radially inward in response to movement of the detent locking means to its second radially aligned operative position.

6. The apparatus of claim 5 further comprising a relatively light compression spring mounted between the detent locking means and the abutment means on the outer collar for urging the abutment means away from the detent locking means toward engagement with the inner collar.

7. The apparatus of claim 1 where the outer sleeve surrounds the inner sleeve, the detent means, the detent locking means and a portion of the sleeve, whereby the inner sleeve, the detent means and the detent locking means are protected from accidental contact.

8. The apparatus of claim 1 wherein the sleeve further comprises a yoke on an end thereof opposite an open end which receives a power takeoff stub shaft and further comprising a bell mounted on the sleeve for relative rotation, whereby the yoke and the sleeve may rotate within the bell, the bell having an inner end extending within the outer collar whereby the outer collar and bell cooperate to prevent accidental contact with the sleeve.

* * * * *